US012675718B2

(12) United States Patent (10) Patent No.: US 12,675,718 B2
Horii et al. (45) Date of Patent: Jul. 7, 2026

(54) AHEAD-OF-TIME GATE-FUSION TRANSPILATION FOR SIMULATION

(71) Applicant: INTERNATIONAL BUSINESS MACHINES CORPORATION, Armonk, NY (US)

(72) Inventors: Hiroshi Horii, Tokyo (JP); Christopher James Wood, Long Island City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1030 days.

(21) Appl. No.: 17/564,149

(22) Filed: Dec. 28, 2021

(65) Prior Publication Data

US 2023/0206101 A1 Jun. 29, 2023

(51) Int. Cl.
*G06N 10/20* (2022.01)
*G06N 10/00* (2022.01)

(52) U.S. Cl.
CPC ............. *G06N 10/20* (2022.01); *G06N 10/00* (2019.01)

(58) Field of Classification Search
CPC ............................... G06N 10/20; G06N 10/00
See application file for complete search history.

(56) References Cited

U.S. PATENT DOCUMENTS 11,010,517 B2 5/2021 Nam et al.
11,010,527 B2 5/2021 Martiel et al.

11,042,813 B2 6/2021 Gidney
11,093,669 B2 * 8/2021 Chen ................... G06F 30/3308
2011/0239182 A1 * 9/2011 Nitta ....................... G06F 30/30
716/135
2020/0104459 A1 * 4/2020 Tong ...................... G06N 7/023
2020/0184025 A1 * 6/2020 Horii ...................... G06F 30/20
2020/0184031 A1 6/2020 Horii et al.
2020/0285986 A1 9/2020 Javadiabhari et al.
2020/0342344 A1 10/2020 Gambetta et al.
2021/0117324 A1 4/2021 Gunnels et al.
2021/0232963 A1 7/2021 Gimeno-Segovia et al.

(Continued)

OTHER PUBLICATIONS

Li, C. K., Roberts, R., & Yin, X. (2013). Decomposition of unitary matrices and quantum gates. International Journal of Quantum Information, 11(01), 1350015. (Year: 2013).*

(Continued)

*Primary Examiner* — James T Tsai
(74) *Attorney, Agent, or Firm* — Amin, Turocy & Watson, LLP

(57) ABSTRACT

A computer-implemented method of gate-fusion transpilation for a simulation operation includes receiving a quantum circuit data representing a quantum circuit. A first quantum gate manipulates a state of a qubit in the quantum circuit. A measure gate is configured to measure the state of the qubit. The quantum circuit data is compiled into a format compatible with the simulated operation of the quantum circuit. A gate-fusion transpilation procedure based on a configuration of the quantum circuit is retrieved and executed by a computing device when pre-stored in a cache, or is created and executed by the computing device when it is determined there is no pre-storage in cache. The simulated operation of the quantum circuit is performed and a result is output.

20 Claims, 9 Drawing Sheets

(56)  References Cited

U.S. PATENT DOCUMENTS

| | | | |
|---|---|---|---|
| 2021/0279628 A1 | 9/2021 | Noel et al. | |
| 2021/0304053 A1 | 9/2021 | Pant et al. | |
| 2022/0067245 A1* | 3/2022 | Steiger .................. | G06N 10/00 |
| 2022/0237352 A1* | 7/2022 | Flöther .................. | G06N 10/00 |

OTHER PUBLICATIONS

Doi. J. et al., "Cache Blocking Technique to Large Scale Quantum Computing Simulation on Supercomputers"; QCE IEEE International Conference (2020); 13 pgs.
Earnest, N. et al., "Pulse-Efficient Circuit Transpilation for Quantum Applictions on Cross-Resonance-Based Hardware"; arXiv:2105.01063v1 (2021); 12 pgs.
Leymann, F. et al., "The Bitter Truth About Gate-Based Quantum Algorithms In The NISQ Era", Quantum Science And Technology (2020); vol. 5:4; 29 pgs.
Wilson, E. et al., "Just-in-time Quantum Circuit Transpilation Reduces Noise"; arXiv:2005.12820v1 (2020); 11 pgs.
Liu, J. et al., "Relaxed Peephole Optimization: A Novel Compiler Optimization for Quantum Circuits"; CGO'21 19th IEEE/ACM Inter. Symp (2021); 14 pgs.

* cited by examiner

200

205     210     215     220

O.     Ry     $\theta_0$     $q_0$

```
map<CircuitKey,
    vector<tuple<uint, string, vector<uint>>>> cache

CircuitKey key = { ops };

auto it = cache.find(key);

if (it != cache.end()) { auto value = it->second;

for (const auto entry: value) { auto tgtIdx = entry.first;

auto srcIdxs = entry.second.first;

ops[tgtIdx] = generate_operation(method,
                                         ops,
                                         srcIdxs);

}
}
```

805

800

AHEAD-OF-TIME GATE-FUSION TRANSPILATION FOR SIMULATION

BACKGROUND

Technical Field

The present disclosure generally relates to quantum computing simulation, and more particularly, to a method of reducing gate fusion time.

Description of the Related Art

Quantum computing simulation is a tool used for development of quantum applications. Functions such as debugging with an ideal simulation, testing with noise simulation, and a study of quantum applications without real devices can be performed with a simulation executed by a classical computer. As a quantum computer operates very differently than a classical computer, quantum computing simulations are transpiled. Transpilation can be defined as a conversion of a set of gate operations to another set of gate operations. Transpilation is performed to operate an application on a different backend. As the geometry of quantum architecture and qubit connectivity can vary, circuits can be optimized by reducing or eliminating redundancies. For example, the circuit can be optimized by being written into equivalent gates.

Gate applications are responsible for a signification portion of the computational costs in quantum computing simulation. A memory footprint used in gate applications can be reduced by the fusion of multiple gates into a larger gate.

SUMMARY

In one embodiment, a computer-implemented method of gate-fusion transpilation for a simulation operation includes receiving a quantum circuit data representing a quantum circuit. A first quantum gate manipulates a state of one or more qubits in the quantum circuit. The quantum circuit data is compiled into a format compatible with the simulated operation of the quantum circuit. A gate-fusion transpilation procedure based on a configuration of the quantum circuit is retrieved and executed by a computing device when pre-stored in a cache, or is created and executed by the computing device when it is determined there is no pre-storage in cache. The simulated operation of the quantum circuit is performed and the result is output.

In an embodiment, the gate-fusion transpilation procedure performs a fusing of data of a first quantum gate with one or more additional quantum gates into a gate based on a gate fusion strategy.

In an embodiment, the created gate fusion transpilation procedure is stored in the cache.

In an embodiment, the gate-fusion transpilation procedure includes generating a cache key from a quantum circuit without parameters.

In an embodiment, the gate-fusion transpilation procedure includes generating a cache value from a source gate and a target gate of fused gates.

In an embodiment, the cache value table includes a sequential number, a fusion method and a listing of the fused gates for each sequence number.

In an embodiment, the quantum circuit is identified as an original quantum circuit. The transpilation procedure generates an enhanced quantum circuit comprising fewer gate operations than the original quantum circuit.

In an embodiment, the generated enhanced quantum circuit includes a same quantity of gate operations as a quantity of fused gates.

In one embodiment, a computing device is configured to perform a gate-fusion transpilation. The device includes a processor and a memory coupled to the processor. The memory storing instructions cause the processor to perform acts including receiving a quantum circuit data representing a quantum circuit including a first quantum gate that manipulates a state of a qubit in the quantum circuit, compiling the quantum circuit data into a format compatible with a simulated operation of the quantum circuit; retrieving and executing, by a computing device, a gate-fusion transpilation procedure based on a configuration of the quantum circuit upon determining the transpilation procedure is pre-stored in a cache; creating and executing, by a computing device, the gate-fusion transpilation procedure based on the configuration of the quantum circuit upon determining there is no transpilation procedure pre-stored in the cache; and performing the simulated operation of the quantum circuit and outputting a result of the simulated operation of the quantum circuit.

In one embodiment, a non-transitory computer readable storage medium tangibly embodying a computer readable program code has computer readable instructions that, when executed, causes a computer device to carry out a method of gate-fusion transpilation, the method including: receiving a quantum circuit data representing a quantum circuit including a first quantum gate that manipulates a state of a qubit in the quantum circuit. The quantum circuit data is transcompiled into a format compatible with a simulated operation of the quantum circuit. A computing device retrieves and executes a gate-fusion transpilation procedure based on a configuration of the quantum circuit upon determining the transpilation procedure is pre-stored in a cache. The gate-fusion transpilation procedure is based on the configuration of the quantum circuit upon determining there is no transpilation procedure pre-stored in the cache. A simulated operation of the quantum circuit is performed and a result of the simulated operation of the quantum circuit is output.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
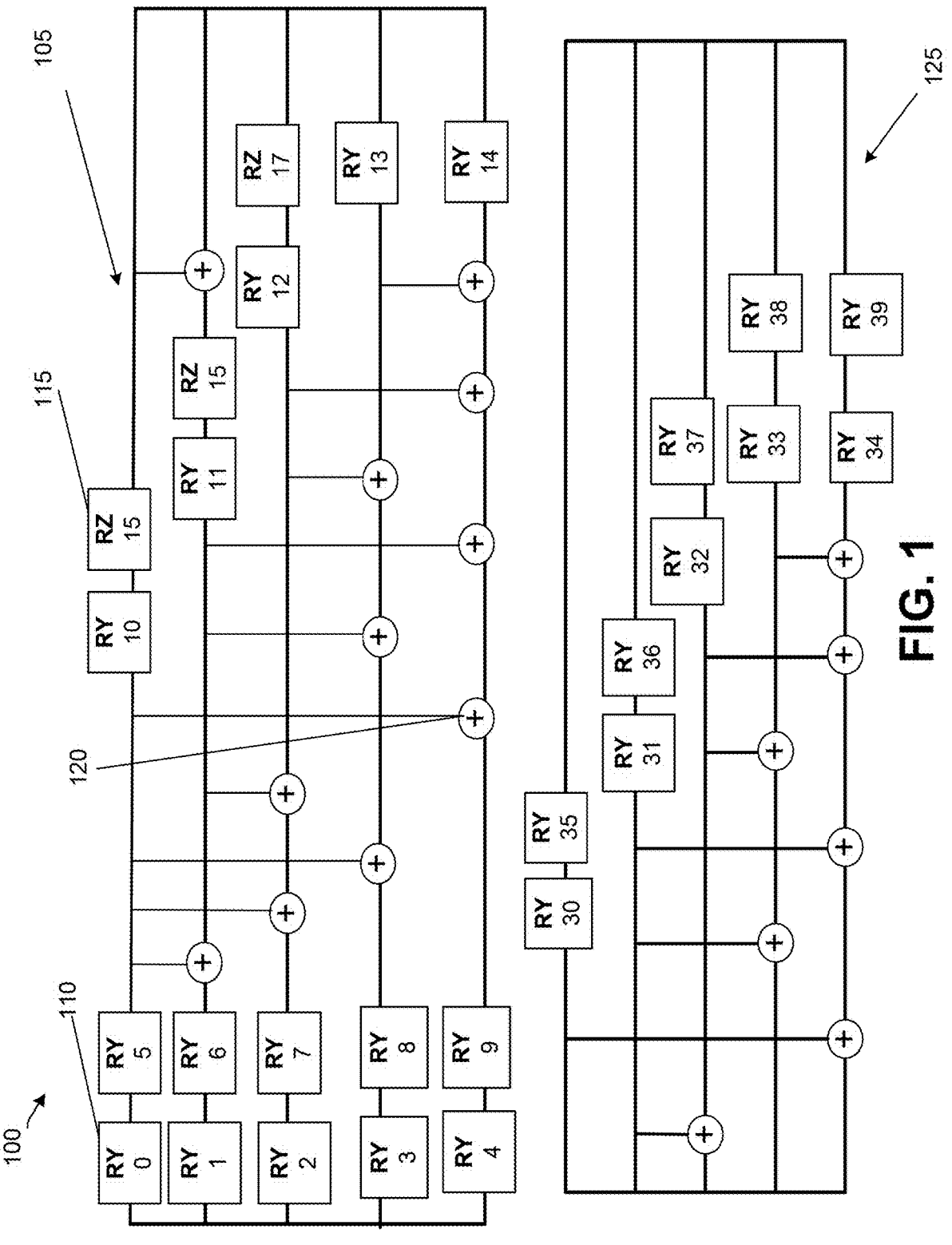
FIG. 1 illustrates an overview of an application of Variational Quantum Eigensolver (VQE), consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings. It is to be understood that the present disclosure is not limited to the depictions in the drawings, as there may be fewer elements or more elements than shown and described.

As used herein, certain terms are used indicating what may be considered an idealized behavior, such as, for example, "lossless," "superconductor," or "superconducting," which are intended to cover functionality that may not be exactly ideal but is within acceptable margins for a given application. For example, a certain level of loss or tolerance may be acceptable such that the resulting materials and structures may still be referred to by these "idealized" terms.

As used herein, the term compiling generally refers to translating from one source language to another.

As used herein, the term "gate-fusion transpilation" generally refers to a technique in which multiple gates are merged into a single gate For example, the gate may be a unitary gate or a Kraus operator. A gate-fusion transpilation technique can include finding a best strategy of the fusing the gates according to a system configuration.

The strategies to merge multiple gates can be based on a particular type of overhead. For example, the gate-fusion transpilation technique can be performed with cost-based fusion, N-qubit fusion, or diagonal fusion.

Gate-fusion can cause a bottleneck in a quantum simulation operation as the number of gates in a circuit increases. For example, a transpilation execution time increases in both proportion and total time when there are number of qubits used are increased. The computation costs increase as a number of qubits and a depth of quantum circuits increase.

FIG. 1 illustrates an overview 100 of an application of Variational Quantum Eigensolver (VQE), consistent with an illustrative embodiment. It can be seen that the configuration 105 has more qubits than the configuration 125. Both circuits are illustrated as having Ry gates 110, Rz gates 115 and adders 120. The VQE application is used, for example, in quantum chemistry where a quantum computer is trained to prepare the ground state of a given molecule. VQE applications request the same circuits except for their parameter values. In this example, the hydride of magnesium $MgH_2$ is simulated by the configuration 105, and the beryllium hydride $BeH_2$ is simulated by the configuration 225. The configurations 105, 125 have large differences in qubit simulations. For example, $MgH_2$ has a 48 hour time to run a 20-qubit simulations 21,000 times with different parameters, and $BeH_2$ takes a 48 minute time to run a 12-qubit simulation 3,900 times, with different parameters.

According to an embodiment of the present disclosure, the transpiled circuits with gate-fusion for each molecule are the same except for their parameters. Thus, the present disclosure teaches caching and reproducing a procedure of gate-fusions transpilation. The transpiled circuits can be generated for simulation without the gate parameters. A reduction in computing costs and an enhanced operation can result.

Additional features of the method and device of the present disclosure are disclosed herein.

Example Embodiments

Figure 2:
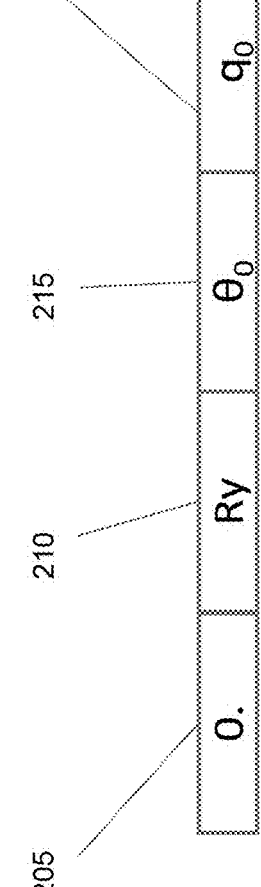
FIG. 2 illustrates a gate operation, consistent with an illustrative embodiment.

FIG. 2 illustrates a gate operation 200, consistent with an illustrative embodiment. There is a sequential number 205, a gate type 210, a parameter 215 and a target qubit 220. The gate type 210 shown is Ry, which indicates that R is a rotational gate that rotates about the Y axis. Other gates types can include Rx, which indicates a rotational gate about the X axis. The parameter 215 is the angle of rotation.

Figure 3:
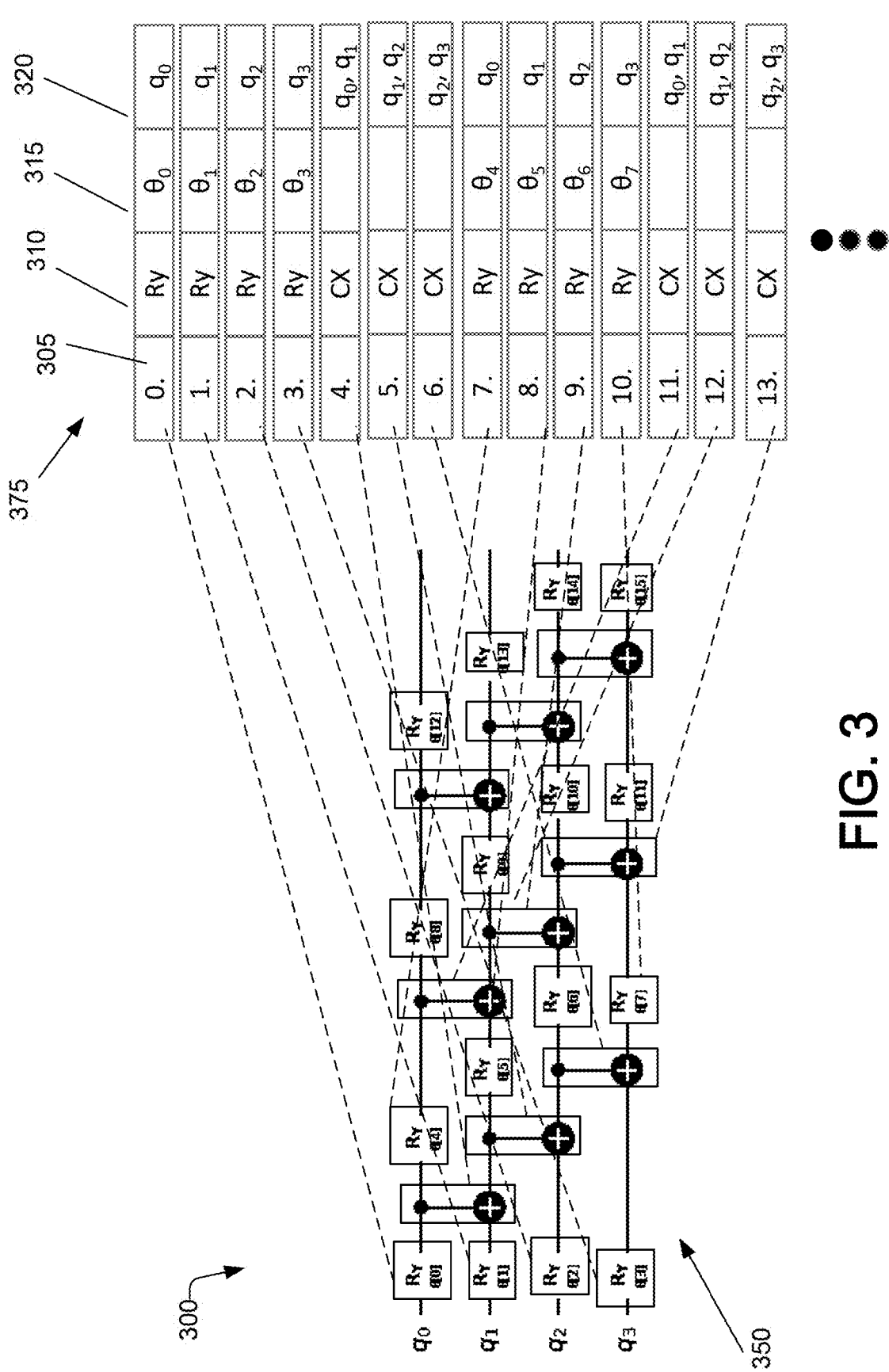
FIG. 3 illustrates a circuit having a list of gate operations, consistent with an illustrative embodiment.

FIG. 3 illustrates a circuit 300 having a list of gate operations, consistent with an illustrative embodiment. An original circuit 350 is shown, and a list of multiple gate operations 375 of the type shown in FIG. 2. For example, there is shown a group of columns of a sequence number 305, a gate type 310, a parameter 315 and a target qubit 320. The gate type 310 shown include Ry, a gate that rotates about a Y axis, and a controlled X gate (Cx) can be used for a controlled NOT operation. The Cx gate can act on two or more qubits.

Figure 4:
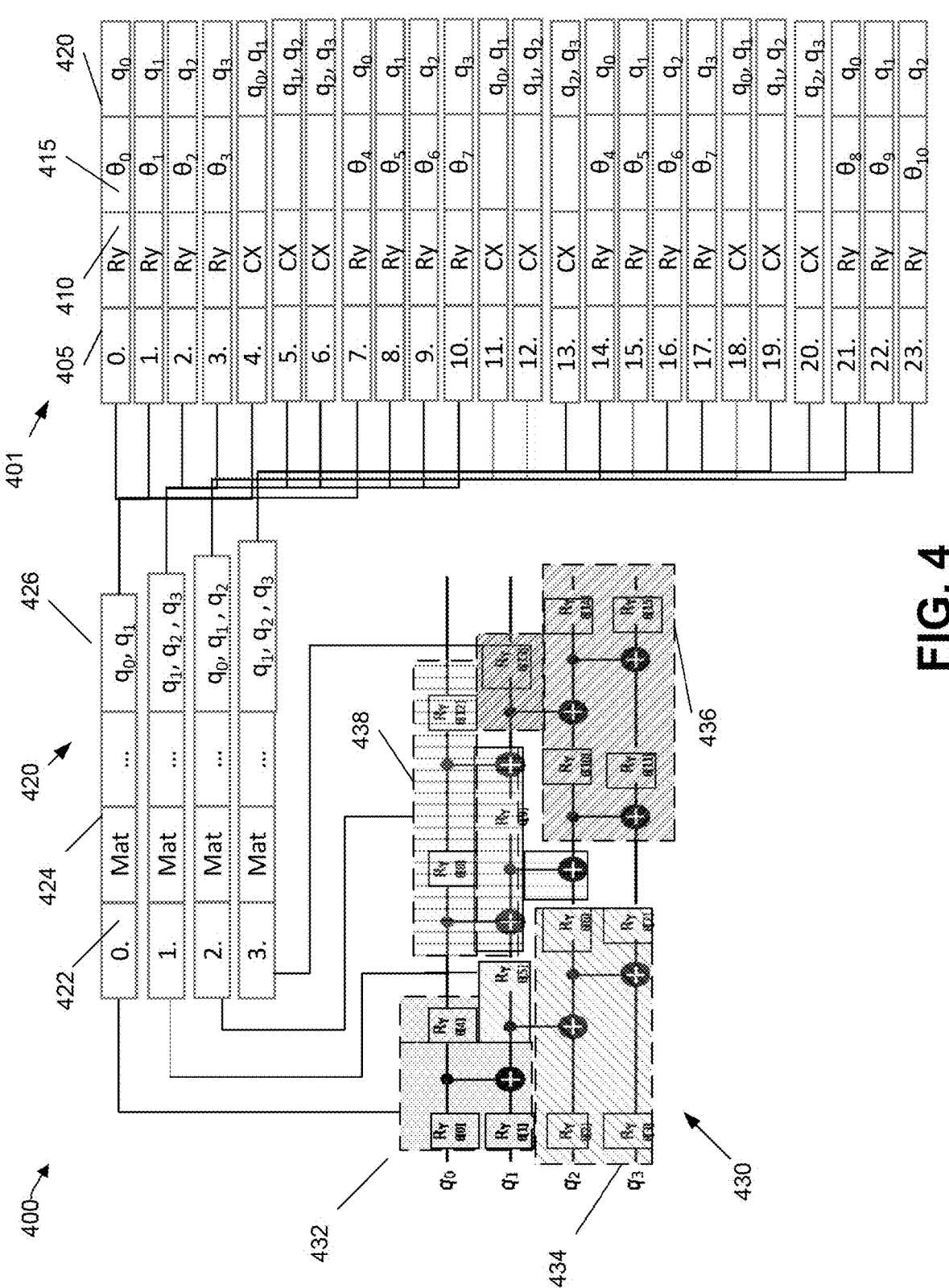
FIG. 4 illustrates a gate fusion technique to aggregate gates, consistent with an illustrative embodiment.

FIG. 4 illustrates a gate fusion technique 400 to aggregate gates, consistent with an illustrative embodiment. An original circuit list 401, an optimized (e.g. enhanced) circuit list 420, and groups of aggregated gates 430 are shown. Each group of aggregated gates 432, 434, 436 and 438 are shown with different shading.

The optimized circuit 420 has been reduced to four sequences 422 (0, 1, 2, 3), whereas the original circuit list 401 shows 24 sequences 405. The target qubits 426 have groups of two or three groups of aggregated gates. In the original circuit list 401, the target qubits 420 are singular except for the Cx gates. The optimized circuit 420 includes a list of matrices 424. Each matrix can represent q-bits and can be column steps of a gate-fusion algorithm. Each cell of the matrix 424 contains an aggregated quantum gate.

Figure 5:
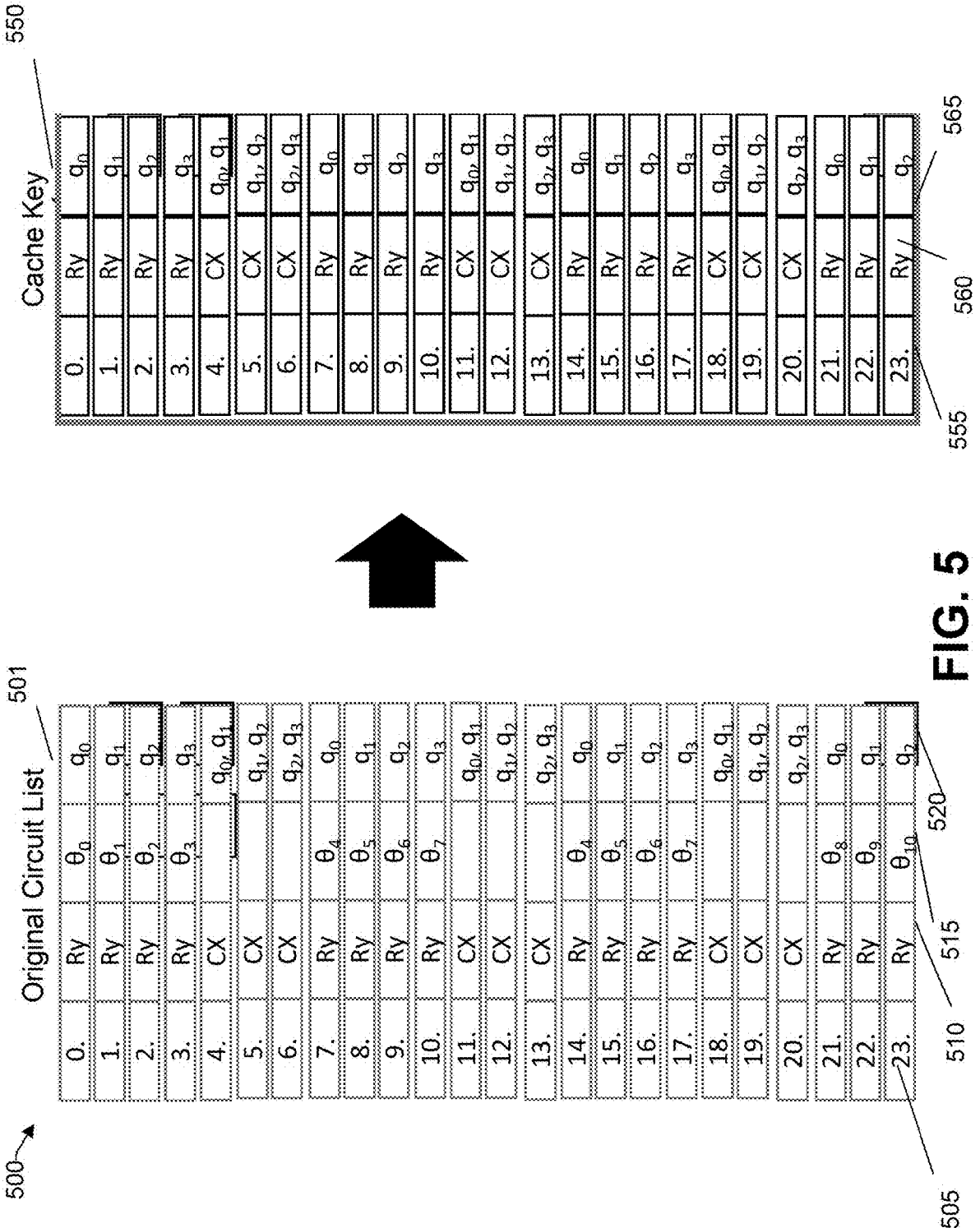
FIG. 5 illustrates the generation of a cache key from a circuit without parameters, consistent with an illustrative embodiment.

FIG. 5 illustrates an operation 500 of the generation of a cache key 550 from a circuit without parameters, consistent with an illustrative embodiment. According to an embodiment of the present disclosure, a cache key can be generated from an original circuit (e.g., a non-aggregated circuit) list 501 with parameters. The cache key 550 is generated from the original circuit list 501. The cache key 550 is the information that a cache can use to select a single response. While the original circuit list 501 includes a sequence number 505, gate type 510, parameter value 515 and target qubit 520, it is shown in FIG. 5 that the cache key does not include a parameter column because subsequent retrieval of the cache key for operating a transpilation procedure does not use the parameter values. The cache key 550 has a sequence number 555, gate type 560 and target qubit(s) 565.

Figure 6:
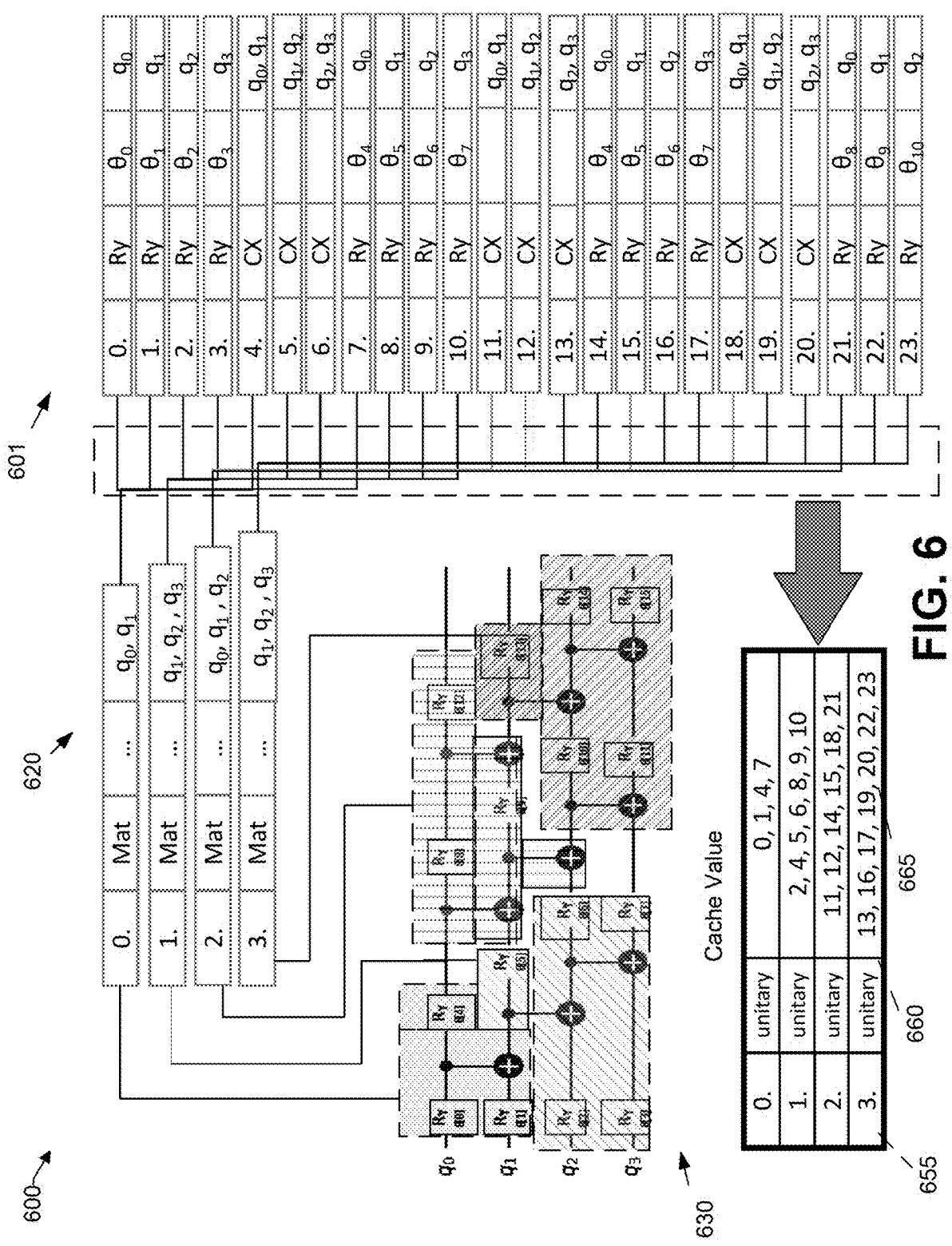
FIG. 6 illustrates the generation of a cache value from source and target gates of fused gates, consistent with an illustrative embodiment.

FIG. 6 is an illustration 600 of the generation of a cache value from source gates and target gates of fused gates, consistent with an illustrative embodiment. Similar to FIG. 4, there is included in FIG. 6 an original circuit list 601, an optimized circuit list 620, and aggregated gates 630. The dashed boxed around the lines showing the correspondence of the optimized circuit 620 to the original circuit list 601 are summarized in a cache value table. The cache value includes sequence number 655, the fusion method 660, and the fused gates 665 making up the respective aggregations of the aggregated gates 630.

Figure 7:
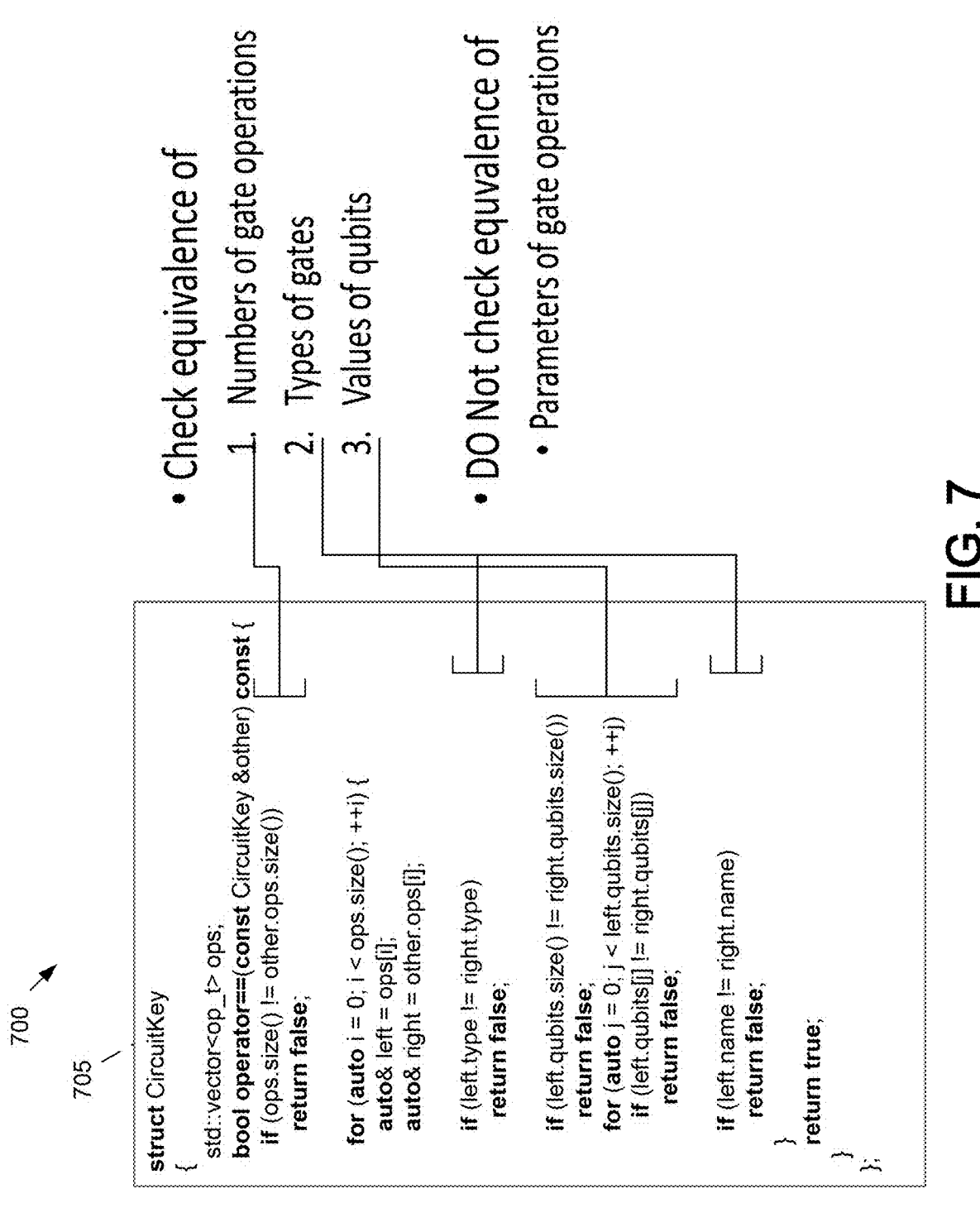
FIG. 7 illustrates the implementation of a cache key, consistent with an illustrative embodiment.

FIG. 7 illustrates the implementation of a cache key 700, consistent with an illustrative embodiment. There is shown a list of sample operation 705 that are used to check the equivalence of the sequential numbers of gate operations, the types of gates and the values of qubits in an original circuit and the cache key. In one embodiment, there is no checking of parameters needed because the aggregation of gate operations may be performed without using the gate parameters of the original circuit.

Figure 8:
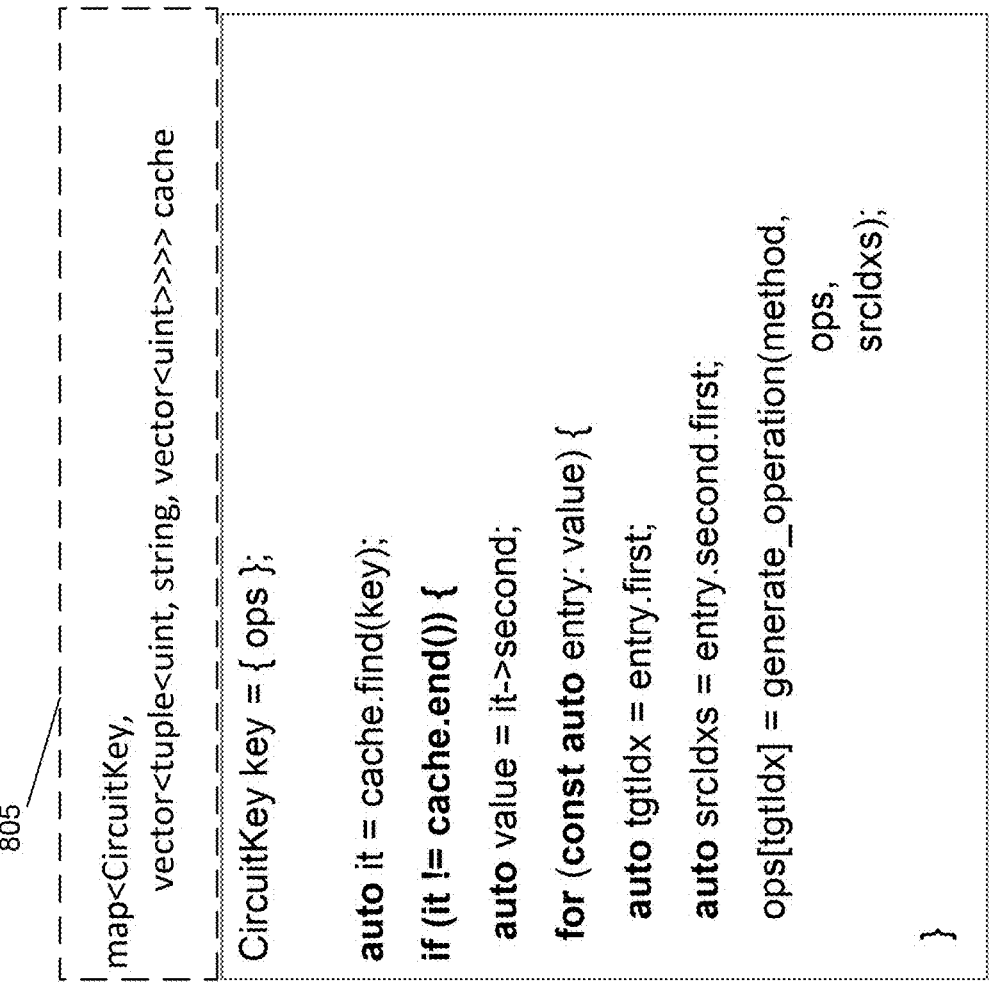
FIG. 8 illustrates an operation of reproducing gate-fusion from a previous run, consistent with an illustrative embodiment.

FIG. 8 illustrates an operation of reproducing gate-fusion 800 from a previous run, consistent with an illustrative embodiment. There is shown a list of sample operations 805. There is an operation to determine whether a cache entry exists for a gate fusion procedure of a particular configured of a quantum circuit. If the cache entry exists, the gate fusion in a previous run is reproduced. For example, an operation is generated, and a gate of a target index is replaced with a generated gate.

In a case where there is not a cache entry, a gate fusion transpilation procedure may be performed while there is a recording of the procedure. The recorded procedure is stored in a cache when the gate fusion transpilation procedure is performed.

Example Process

With the foregoing overview of the example architecture, it may be helpful now to consider a high-level discussion of an example process. To that end, FIG. 9 is a flowchart 900 illustrating a computer-implemented method of gate-fusion transpilation, consistent with an illustrative embodiment.

Figure 9:
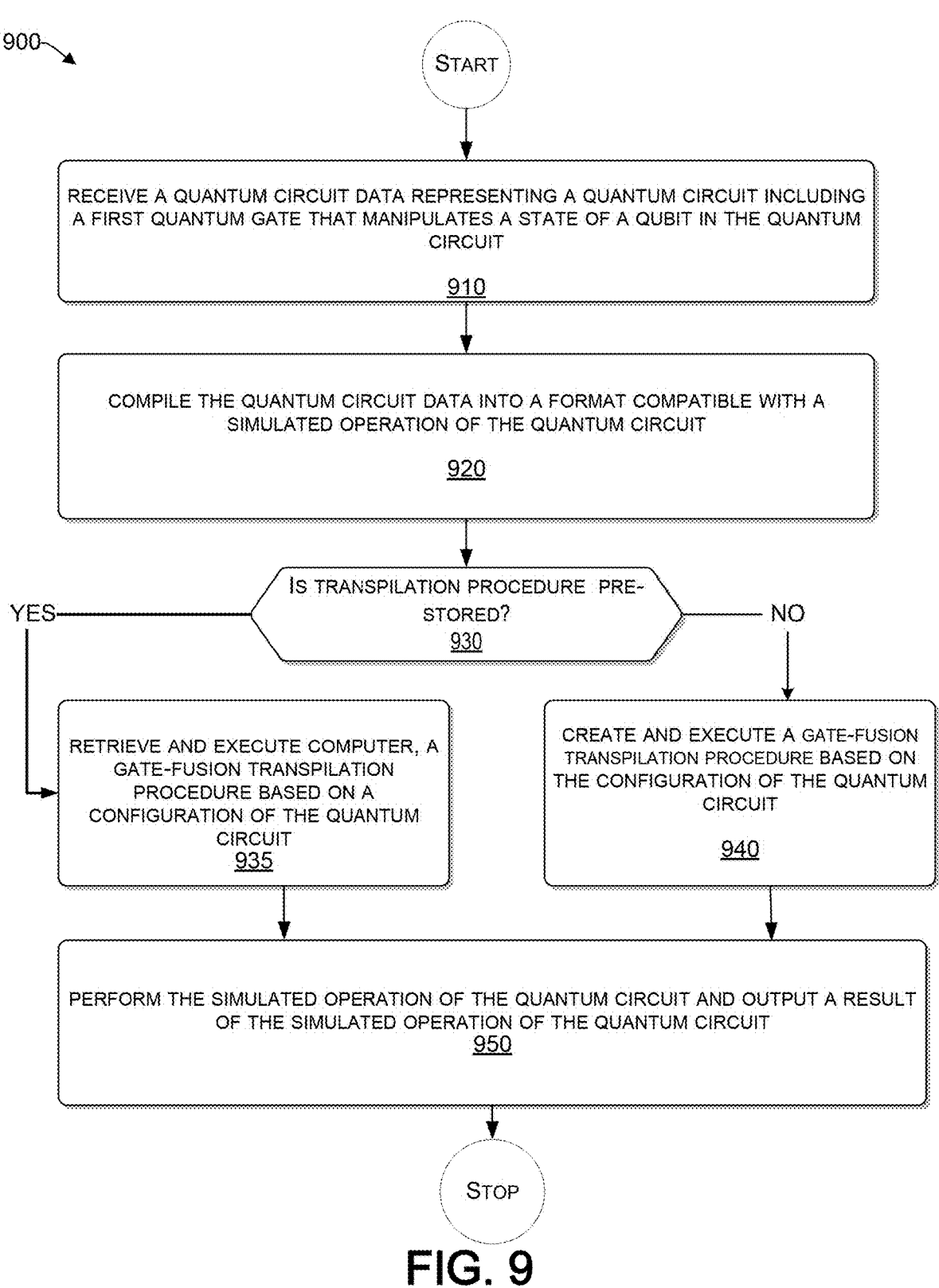
FIG. 9 is a flowchart illustrating a computer-implemented method of gate-fusion transpilation, consistent with an illustrative embodiment.

FIG. 9 is shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At operation 910, a quantum circuit data is received that represents a quantum circuit. The quantum circuit includes a first quantum gate that manipulates a state of a qubit in the quantum circuit.

At operation 920, the quantum circuit data is trans-compiled into a format compatible with a simulated operation of the quantum circuit. For example, the quantum circuit data can be trans-compiled into a Quantum Assembly Language (QASM) file.

At operation 930, a computing device determines whether a transpilation procedure for gate fusion is stored in a cache for execution. The transpilation procedure fuses multiple gates into fewer gates. For example the multiple gates can be fused into a single gate. There can be multiple transpilation procedures stored in cache for different configurations of quantum circuits.

At operation 935, which is a case where the transpilation procedure is pre-stored, a gate fusion transpilation procedure is executed based on a configuration of the quantum circuit. The gate-fusion reduces the number of gates used in the simulation.

At operation 940, which is a case where there is no transpilation procedure pre-stored, a gate fusion transpilation procedure is created and executed based on the configuration of the quantum circuit.

At operation 950, the simulated operation of the quantum circuit is performed by a computing device, and a result is output. The simulated operation of the quantum circuit can be used as a tool to test with noise simulation. In addition, the quantum simulation can be used to study operation using real devices, as well as to debug with an ideal simulation. Although the flowchart ends at operation 950, the transpilation procedure created in operation 940 can be stored in a cache for future use.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, operations, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of gate-fusion transpilation, the method comprising:

receiving, by a system comprising a processor, a quantum circuit data representing a quantum circuit;

compiling, by the system, the quantum circuit data into a format compatible with a simulated operation of the quantum circuit;

generating, by the system, a cache key for the quantum circuit from the compiled quantum circuit data, wherein generating the cache key comprises:

determining the cache key based on a number of gate operations, types of gates, and target qubits of the gate operations in the quantum circuit without using parameter values of any quantum gate operations in the quantum circuit;

checking for an equivalence of the quantum circuit by comparing the cache key to stored cache keys in a cache;

based on the checking:

retrieving and executing, by the system, a gate-fusion transpilation procedure based on a configuration of the quantum circuit, in response to determining that the gate-fusion transpilation procedure associated with a stored cache key matching the cache key is pre-stored in the cache, or creating and executing, by the system, the gate-fusion transpilation procedure based on the configuration of the quantum circuit, in response to determining that none of the stored cache keys in the cache matches the cache key;

performing, by the system, the simulated operation of the quantum circuit; and outputting, by the system, a result of the simulated operation of the quantum circuit.

2. The computer-implemented method according to claim 1, wherein the gate-fusion transpilation procedure performs a fusing of data of a first quantum gate with one or more additional quantum gates into a fused gate based on a gate fusion strategy.

3. The computer-implemented method according to claim 2, further comprising storing the created gate fusion transpilation procedure in the cache.

4. The computer-implemented method according to claim 1, wherein generating the cache key is performed by using a sequence number, a gate type, and a target qubit of each gate operation of the quantum circuit.

5. The computer-implemented method according to claim 1, wherein the gate-fusion transpilation procedure includes generating a cache value table from a source gate and a target gate of fused gates.

6. The computer-implemented method according to claim 5, wherein the cache value table includes a sequential number, a fusion method, and a listing of the fused gates for each sequence number.

7. The computer-implemented method according to claim 1, wherein the quantum circuit is identified as an original quantum circuit, and the method further comprising generating, by the transpilation procedure, an enhanced quantum circuit comprising fewer gate operations than the original quantum circuit.

8. The computer-implemented method according to claim 7, wherein the generated enhanced quantum circuit includes a same quantity of gate operations as a quantity of fused gates.

9. A system comprising:

a processor;

a memory coupled to the processor, the memory storing instructions to cause the processor to perform operations comprising:

receiving a quantum circuit data representing a quantum circuit, compiling the quantum circuit data into a format compatible with a simulated operation of the quantum circuit;

generating a cache key for the quantum circuit from the compiled quantum circuit data, wherein generating the cache key comprises:

determining the cache key based on a number of gate operations, types of gates, and target qubits of the gate operations in the quantum circuit without using parameter values of any quantum gate operations in the quantum circuit;

checking for an equivalence of the quantum circuit by comparing the cache key to stored cache keys in a cache;

based on the checking:

retrieving and executing a gate-fusion transpilation procedure based on a configuration of the quantum circuit in response to determining that the gate-fusion transpilation procedure associated with a stored cache key matching the cache key is pre-stored in the cache, or creating and executing the gate-fusion transpilation procedure based on the configuration of the quantum circuit in response to determining that none of the stored cache keys in the cache matches the cache key;

performing the simulated operation of the quantum circuit; and outputting a result of the simulated operation of the quantum circuit.

10. The computing device according to claim 9, wherein the operations further comprise:

fusing of the quantum circuit data of a first quantum gate with the quantum circuit data of one or more additional quantum gates into a unitary-gate based on a gate fusion strategy.

11. The computing device according to claim 9, wherein the operations further comprise:

storing the created gate fusion transpilation procedure in the cache.

12. The computing device according to claim 11, wherein the operations further comprise:

generating the cache key by using a sequence number, a gate type, and a target qubit of each gate operation of the quantum circuit.

13. The computing device according to claim 9, wherein the operations further comprise: generating a cache value table from a source gate and a target gate of fused gates.

14. The computing device according to claim 9, wherein operations further comprise: including in the cache value table a sequential number, a fusion method and a listing of the fused gates for each sequence number.

15. The computing device according to claim 9, wherein the operations further comprise:

identifying the quantum circuit as an original quantum circuit; and generating an enhanced quantum circuit comprising fewer gate operations than the original quantum circuit.

16. A non-transitory computer readable medium having instructions stored thereon that, in response to execution, causes a system comprising a processor to perform operations comprising:

receiving a quantum circuit data representing a quantum circuit, compiling the quantum circuit data into a format compatible with a simulated operation of the quantum circuit;

generating a cache key for the quantum circuit from the compiled quantum circuit data, wherein generating the cache key comprises:

determining the cache key based on a number of gate operations, types of gates, and target qubits of the gate operations in the quantum circuit without using parameter values of any quantum gate operations in the quantum circuit;

checking for an equivalence of the quantum circuit by comparing the cache key to stored cache keys in a cache;

based on the checking:

retrieving and executing a gate-fusion transpilation procedure based on a configuration of the quantum circuit in response to determining that the gate-fusion transpilation procedure associated with a stored cache key matching the cache key is pre-stored in the cache, or creating and executing the gate-fusion transpilation procedure based on the configuration of the quantum circuit in response to determining that none of the stored cache keys in the cache matches the cache key;

performing the simulated operation of the quantum circuit; and outputting a result of the simulated operation of the quantum circuit.

17. The non-transitory computer readable medium of claim 16, wherein the operations further comprise:

fusing of the quantum circuit data of a first quantum gate with the quantum circuit data of one or more additional quantum gates into a unitary-gate based on a gate fusion strategy.

18. The non-transitory computer readable medium of claim 16, wherein the operations further comprise:

storing the created gate fusion transpilation procedure in the cache.

19. The non-transitory computer readable medium of claim 16, wherein the operations further comprise:

generating the cache key by using a sequence number, a gate type, and a target qubit of each gate operation of the quantum circuit.

20. The non-transitory computer readable medium of claim 19, wherein the operations further comprise:

generating a cache value table from a source gate and a target gate of fused gates.

* * * * *